United States Patent
Rappa et al.

(10) Patent No.: US 12,216,689 B2
(45) Date of Patent: Feb. 4, 2025

(54) SYSTEM AND METHOD FOR GENERATING AND IMPLEMENTING CONTEXT WEIGHTED WORDS

(71) Applicant: JPMorgan Chase Bank, N.A., New York, NY (US)

(72) Inventors: Robert J. Rappa, Manalapan, NJ (US); Pedro A. Reyes, Bronx, NY (US); Erica J. Kim, Brooklyn, NY (US); Chen Trilnik, New York, NY (US); Michael Harmon, New York, NY (US); Stephen Farrell, Lincoln University, PA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 2 days.

(21) Appl. No.: 17/026,805

(22) Filed: Sep. 21, 2020

(65) Prior Publication Data

US 2021/0089562 A1    Mar. 25, 2021

Related U.S. Application Data

(60) Provisional application No. 62/903,033, filed on Sep. 20, 2019.

(51) Int. Cl.
*G06F 16/31* (2019.01)
*G06F 9/46* (2006.01)
(Continued)

(52) U.S. Cl.
CPC ............ *G06F 16/313* (2019.01); *G06F 9/466* (2013.01); *G06F 16/3334* (2019.01);
(Continued)

(58) Field of Classification Search
CPC ........ G06F 16/35; G06F 9/466; G06F 16/313; G06F 16/3334; G06F 16/367
See application file for complete search history.

(56) References Cited

U.S. PATENT DOCUMENTS

| | | | |
|---|---|---|---|
| 6,353,825 B1* | 3/2002 | Ponte | G06F 16/951 |
| | | | 707/999.005 |
| 7,536,413 B1* | 5/2009 | Mohan | G06F 16/355 |
| | | | 707/999.102 |

(Continued)

OTHER PUBLICATIONS

Al-Anzi, Fawaz S., Dia AbuZeina and Shatha Hasan. "Utilizing Standard Deviation in Text Classification Weighting Schemes." (2017). (Year: 2017).*

(Continued)

*Primary Examiner* — Brittany N Allen
(74) *Attorney, Agent, or Firm* — Greenblum & Bernstein, P.L.C.

(57) ABSTRACT

An embodiment of the present invention is directed to generating an n-gram-based string similarity score where the n-grams sourcing from frequent words, given the context of interest, may be under-weighted and the n-grams sourcing from infrequent words, given the context of interest, may be over-weighted. An embodiment of the present invention is directed to defining a weight for each 2-gram depending on whether or not the word from which it sourced was frequent based on the relevant context.

18 Claims, 6 Drawing Sheets

(51) Int. Cl.
  *G06F 16/35*    (2019.01)
  *G06F 16/36*    (2019.01)
  *G06F 40/289*   (2020.01)

(52) U.S. Cl.
  CPC ............ *G06F 16/35* (2019.01); *G06F 16/367* (2019.01); *G06F 40/289* (2020.01)

(56) References Cited

U.S. PATENT DOCUMENTS

| | | | |
|---|---|---|---|
| 7,711,734 B2* | 5/2010 | Leonard | G06Q 30/02 707/754 |
| 8,744,835 B2* | 6/2014 | Abir | G06F 40/55 704/10 |
| 9,898,515 B1* | 2/2018 | Avagyan | G06F 16/29 |
| 2007/0073678 A1* | 3/2007 | Scott | G06F 16/374 |
| 2009/0171955 A1* | 7/2009 | Merz | G06F 16/90344 |
| 2010/0174670 A1* | 7/2010 | Malik | G06F 16/35 706/12 |
| 2014/0215506 A1* | 7/2014 | Kalmes | H04N 21/4524 725/14 |
| 2015/0032616 A1* | 1/2015 | Blackhurst | G06Q 40/02 705/42 |
| 2019/0147450 A1* | 5/2019 | Bharghavan | G06Q 20/40145 705/75 |
| 2019/0205993 A1* | 7/2019 | Rodriguez | G06Q 40/12 |
| 2020/0233857 A1* | 7/2020 | Fehling | G06Q 10/10 |

OTHER PUBLICATIONS

U.S. Appl. No. 15/627,678, filed Jun. 2017, Stephen Farrell.

* cited by examiner

| zip3 | word | word_freq | word_rank | word_freq_scoring | #_stddev_from_mean |
|---|---|---|---|---|---|
| 87 | AUTO | 0.006862951 | 1 | 0.721163004 | 22.32842219 |
| 87 | OCEAN | 0.006129505 | 2 | 0.737524855 | 19.89722885 |
| 87 | SHORE | 0.006024728 | 3 | 0.740020862 | 19.54991551 |
| 87 | TOMS | 0.005710394 | 4 | 0.747777976 | 18.50797551 |
| 87 | RIVER | 0.005448449 | 5 | 0.754575696 | 17.63969217 |
| 87 | LAKEWOOD | 0.005134116 | 6 | 0.763178117 | 16.59775216 |
| 87 | CT | 0.004767393 | 7 | 0.773906345 | 15.38215549 |
| 87 | BRICK | 0.004610226 | 8 | 0.778759251 | 14.86118549 |
| 87 | JERSEY | 0.004400671 | 9 | 0.785493713 | 14.16655882 |

| sic2 | word | word_freq | word_rank | word_freq_forscoring | #_stddev_from_mean |
|---|---|---|---|---|---|
| 58 | CAFE | 0.01847811 | 1 | 0.577780815 | 170.7328812 |
| 58 | REST | 0.017687121 | 2 | 0.584114288 | 163.4220662 |
| 58 | PIZZA | 0.016470213 | 3 | 0.594433594 | 152.1746585 |
| 58 | EATS4 | 0.013774134 | 4 | 0.620311903 | 127.2558327 |
| 58 | BAR | 0.012031998 | 5 | 0.63988742 | 111.1539404 |
| 58 | GRILL | 0.010387774 | 6 | 0.661159171 | 95.95701188 |
| 58 | FOOD | 0.007218219 | 7 | 0.713856639 | 66.66203956 |
| 58 | HOUSE | 0.005742544 | 8 | 0.746965214 | 53.02294168 |
| 58 | LA | 0.005487274 | 9 | 0.753547797 | 50.66357167 |

Figure 2

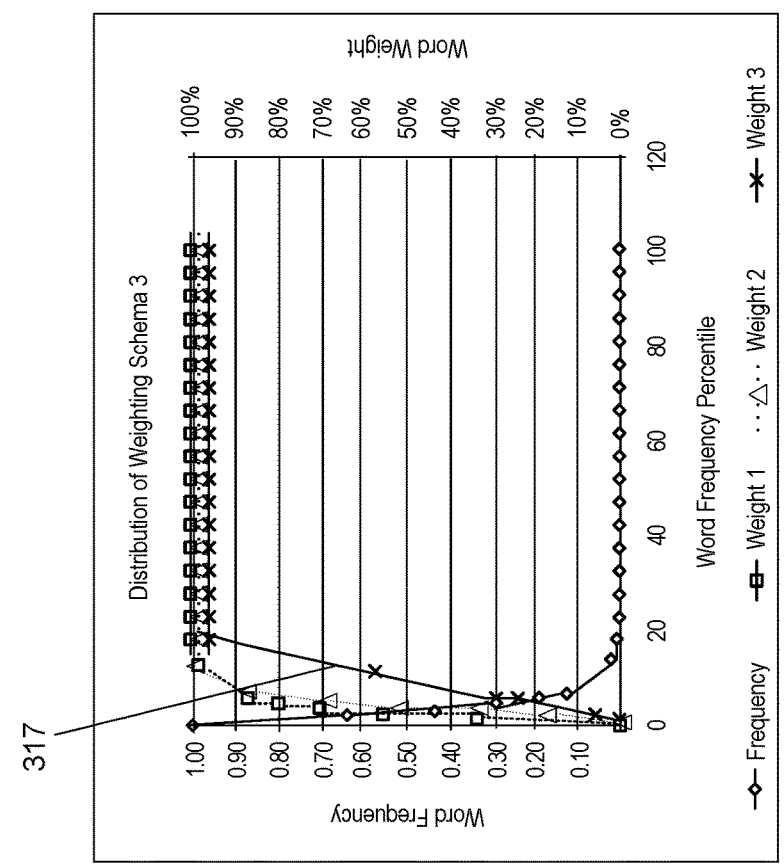
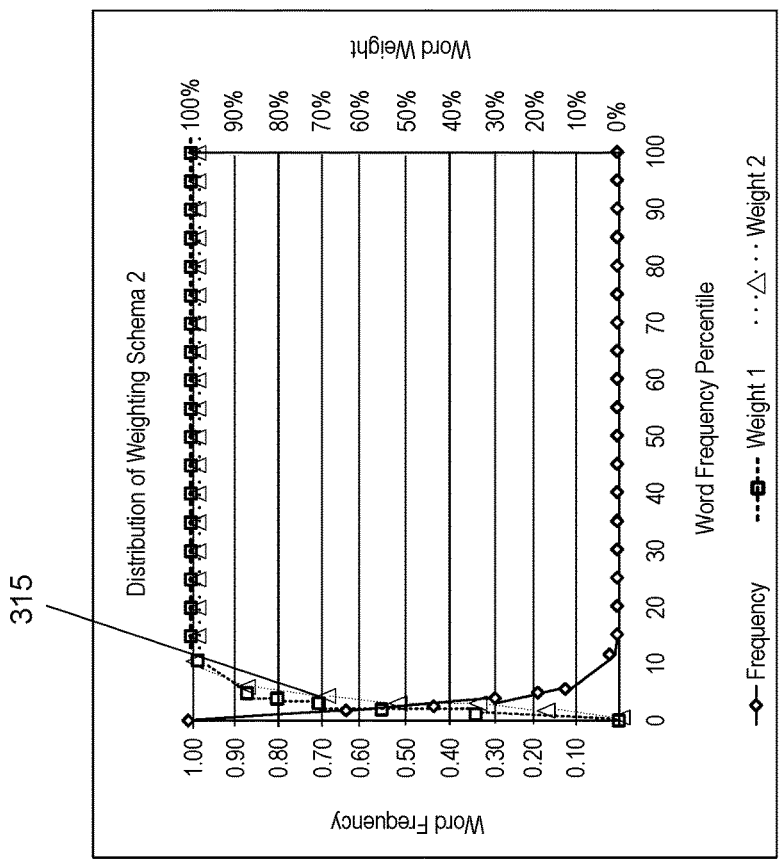
Figure 3B

Formulation 410

$$CWW\ Similarity = \frac{\sum_{nci}^{w_n}}{\sum_{nci}^{w_n}}$$

Let:
= I is the intersection of N-Grams between Input A and Input B
= U is the union of N-Grams between Input A and Input B
= n is an iterator over the N-Grams in the each sets
= $w_n$ is the weight of an N-Gram, such that:
  - It is the log of the inverse frequency of the word in a specific context
  - It is bounded between 0 and 1
  - It is the minimum weight if an N-gram appears in multiple words Example

Context Weighted Words Similarity Calculation 420

= ( $W_{JO}$ + $W_{RE}$ + $W_{ES}$ + $W_{ST}$ + .... + $W_{AN}$ + $W_{NT}$ ) /
( $W_{JO}$ + $W_{DE}$ + $W_{ES}$ + $W_{ON}$ + .... + $W_{AN}$ + $W_{NT}$ )

= (1.00 + 0.90 + 0.90 + 0.90 + ... + 0.90 + 0.90) /
(1.00 + 1.00 + 0.90 + 1.00 + ... + 0.90 + 0.90)

= (9.1) / (13)

= 0.70

Input A: JOE'S RESTSAURANT

Input B: JON'S RESTAURA

SYSTEM AND METHOD FOR GENERATING AND IMPLEMENTING CONTEXT WEIGHTED WORDS

CROSS REFERENCE TO RELATED APPLICATIONS

The application claims priority to U.S. Provisional Application 62/903,033, filed Sep. 20, 2019, the contents of which are incorporated herein in their entirety.

FIELD OF THE INVENTION

The invention relates generally to a system and method for generating and implementing a string similarity score where contextual information is used to weight word importance.

BACKGROUND OF THE INVENTION

While many string similarity scores have been documented, none seem to address the contextual importance of specific words within the strings being compared. Consider an example comparing company names in the food industry, e.g., "JOE RESTAURANT" and "JON RESTAURANT." Traditional string metrics will artificially inflate the match score between these strings given they both contain the relatively long word "RESTAURANT."

These and other drawbacks exist.

SUMMARY OF THE INVENTION

According to one embodiment, the invention relates to a system that generates similarity measures using context weighted words. The system comprises: an input configured to receive input data relating to transactions; a memory configured to store and manage context data and the transaction data; and a computer processor coupled to the input and the memory and further configured to perform the steps of: receiving the input data comprising a set of transaction data; applying a pre-processing process to create a list of unique names from the set of transaction data; identifying a context relating to the set of transaction data, the context comprising one or more of: industry, location, timing and season; calculating word frequencies for each unique name from the list of unique names based on the context; creating weights based on a corresponding calculated word frequency for each unique name in the defined context wherein relatively frequent words are weighted less and relatively infrequent words are weighted more; and applying a string similarity algorithm for each transaction against candidates in a truth set, using the weights for each unique name, in order to identify a best matching record.

According to another embodiment, the invention relates to a method that generates context weighted words. The method comprises the steps of: receiving, via an input, the input data relating to transactions, the input data comprising a set of transaction data; applying, via a computer processor, a pre-processing process to create a list of unique names from the set of transaction data; identifying, via the computer processor, a context relating to the set of transaction data, the context comprising one or more of: industry, location, timing and season; calculating, via the computer processor, word frequencies for each unique name from the list of unique names based on the context; creating, via the computer processor, weights based on a corresponding calculated word frequency for each unique name in the defined context wherein relatively frequent words are weighted less and relatively infrequent words are weighted more; and applying, via the computer processor, a string similarity algorithm for each transaction against candidates in a truth set, using the weights for each unique name, in order to identify a best matching record.

The system may include a specially programmed computer system comprising one or more computer processors, interactive interfaces, electronic storage devices, and networks. The computer implemented system and method described herein provide unique advantages to financial institutions, banks and other users, according to various embodiments of the invention. An embodiment of the present invention considers context of words, specifically industry (e.g., food and beverage) as well as location. An embodiment of the present invention more accurately identifies merchants in transaction data by considering context and adjusting similarity scores based on word frequency. Given the word "RESTAURANT" will be very frequent in the food industry, an embodiment of the present invention places less emphasis on that frequent word and instead more emphasis on the infrequent words in a similarity calculation. The innovative solution accounts for the contextual importance of words within a string when calculating a string similarity score, which is unavailable in string similarity metrics in current systems.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2 is an exemplary illustration of weighted words, according to an embodiment of the present invention.

FIGS. 3A and 3B illustrate a distribution of weighting, according to an embodiment of the present invention.

FIG. 4 illustrates an example of context weighted words, according to an embodiment of the present invention.

DETAILED DESCRIPTION OF THE PREFERRED EMBODIMENT(S)

Figure 1:
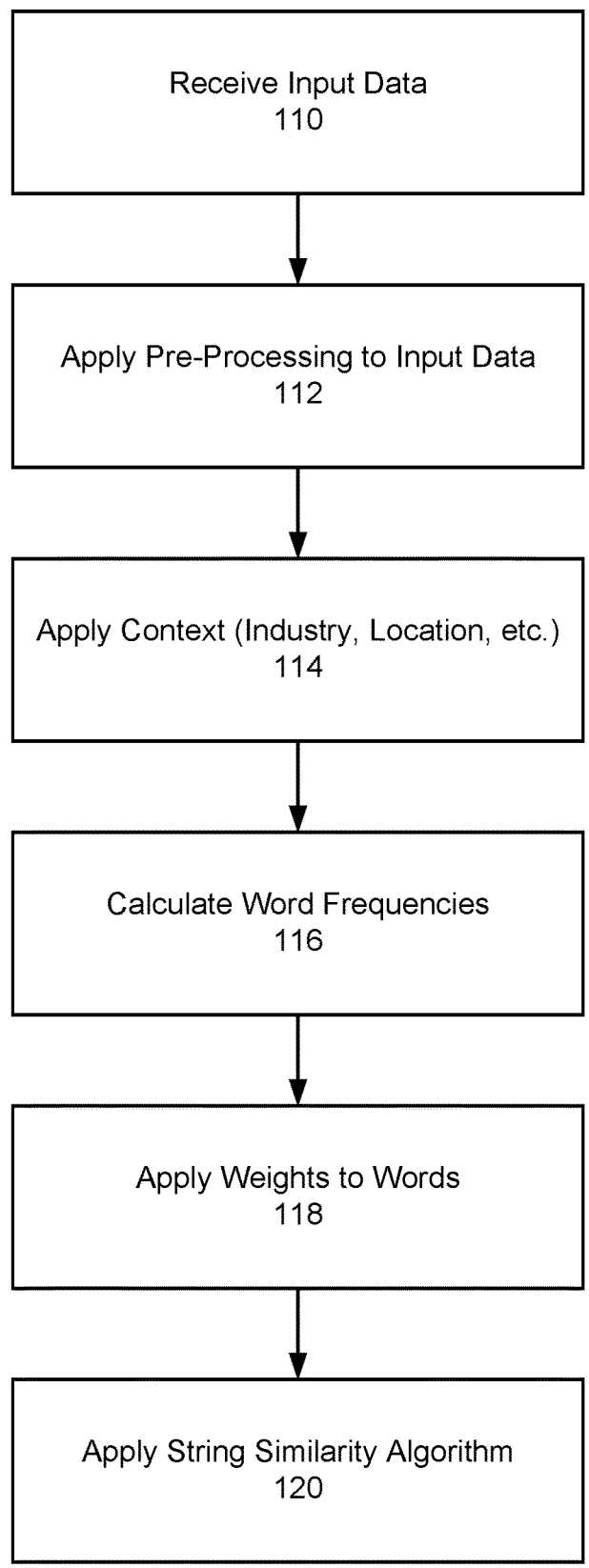
FIG. 1 is an exemplary flowchart for generating context weighted words, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to generating an n-gram-based string similarity score where words may be weighted based on context. The n-grams sourcing from frequent words, given the context of interest, may be under-weighted and the n-grams sourcing from infrequent words, given the context of interest, may be over-weighted. Context of interest may consider industry (e.g., food, beverage, merchant, travel, etc.), location, timing and/or other characteristics and factors.

An exemplary illustration may compare company names in the food industry—"JOE RESTAURANT" and "JON RESTAURANT." The unique 2-grams from "JOE RESTAURANT" are {JO, OE, RE, ES, ST, TA, AU, UR, RA, AN, NT} and the unique n-grams from "JON RESTAURANT" are {JO, ON, RE, ES, ST, TA, AU, UR, RA, AN, NT}. Traditional n-gram based string metrics (e.g., Jaccard, etc.) would calculate a similarity score as the cardinality of the intersection of 2-grams divided by the cardinality of the union of 2-grams, where each 2-gram is weighted equally. This would inevitability result in a large score given both strings have the word "RESTAURANT" in common.

An embodiment of the present invention is directed to defining a weight for each 2-gram depending on whether or not the word from which it sourced was frequent based on the relevant context. For example, relevant context may be industry based as well as location based. Other factors may be considered. Specifically, the 2-grams from the words "JOE" and "JON" can receive weights of greater than one given the words "JOE" and "JON" are infrequent in the context of the food industry, whereas 2-grams from the word "RESTAURANT" can all receive a weight of less than one given the word "RESTAURANT" is frequent in the food industry. The solution may then aggregate the weights of the intersection of 2-grams and divide by the aggregate of the weights of the union of 2-grams for the final score. In a similar manner, location based terms may be weighted accordingly. Another example may include "OCEANSIDE DINER" AND "OCEANSIDE DIVER." Here, an embodiment of the present invention would consider location and adjust the word weighting of the term "OCEANSIDE" accordingly and thereby given "DINER" and "DIVER" more weight and consideration. Other examples may include city names, regions and areas, such as "NEW YORK."

An embodiment of the present invention may infer context based on an analysis of the words, names and/or other related data. For example, an embodiment of the present invention may infer industry, location and other context based on data. According to an embodiment of the present invention, the weights may be defined in a way such that the weights on n-grams from infrequent words are greater than or equal to one and the weights on n-grams from frequent words are less than or equal to one. Other weights and ranges may be considered and applied. The frequency of words, and therefore their contextual importance, may depend on the defined corpus of words for analysis. For example, the weights for n-grams may be defined using a transformation of an inverse document frequency calculation where the corpus may include all known company names in the United States (or other region, location, etc.) and/or observed transactions over a several year history.

The features of the present invention may be applied to transaction data (e.g., Point-of-Sale (PoS) data, Electronic Funds Transfers (EFTs), ACH wire, etc.), lists of companies and other types of information.

An exemplary embodiment of the present invention may be applied to Transaction Data Enrichment. Transaction Data Enrichment realizes the value of transaction data by developing a centralized asset that integrates transactions from across the enterprise and facilitates cross-lines of business (LOB) consumption of transactions, enhancements, and innovations. In accordance with an embodiment of the present invention, context weighted words may be applied to Merchant Tagging and Counterparty Tagging. With Merchant Tagging, issuing PoS enrichment capability provides merchant names, corporate hierarchy, and other firmographics. With Counterparty Tagging, Electronic Funds Transfer (EFT) and Monetary Instruments (MI) enrichment capability may leverage transaction information and internal reference data to create a repository of known counterparties that transact with clients. Additional details of Transaction Data Enrichment may be found in co-pending patent application, U.S. Ser. No. 15/627,678, filed Jun. 20, 2017 ("System and Method for Enrichment of Transaction Data"), which claims priority to U.S. Provisional Application No. 62/352,329, filed Jun. 20, 2016, the contents of which are incorporated by reference herein in their entirety.

FIG. 1 is an exemplary flowchart for generating context weighted words, according to an embodiment of the present invention. At step 110, input data may be received. At step 112, pre-processing may be applied. At step 114, context may be identified and applied. At step 116, word frequencies may be calculated. At step 118, weights may be applied to a word or word set. At step 120, string similarity algorithms may be applied. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details may be provided below.

At step 110, input data may be received. Input data may represent transaction data relating to transactions made at a point-of-sale (PoS) device. Transaction data may identify merchant or service provider. Transaction data may further include electronic funds transfer data, company names, etc.

At step 112, pre-processing may be applied. This may involve cleansing the transaction data for analysis and consumption.

At step 114, context may be identified and applied. Context may include industry, location, season (timing), etc. For example, industry may include food and beverage. Location may include a country, region, state, city and/or other defined geographic location. Season (timing) may refer to holiday season, natural events, world events, etc. Other categories defining context may be applied. Context may also be inferred based on the data collected as well as other information. Context may be applied at varying levels. For example, context may broadly include food and beverage. In another example, context may be specific, such as coffee merchants. In addition, context may include multiple categories such as an industry in a specific region (e.g., coffee merchants in New York). Other variations may be applied.

At step 116, word frequencies may be calculated. The transaction data may be analyzed to identify words based on frequency. In an industry, certain words may be identified as more frequent based on industry (e.g., café, restaurant, etc.) as well as location (e.g., Oceanside, New York , etc.). Other considerations may include timing or seasonal categories (e.g., holiday, Christmas, etc.).

Figure 3A:
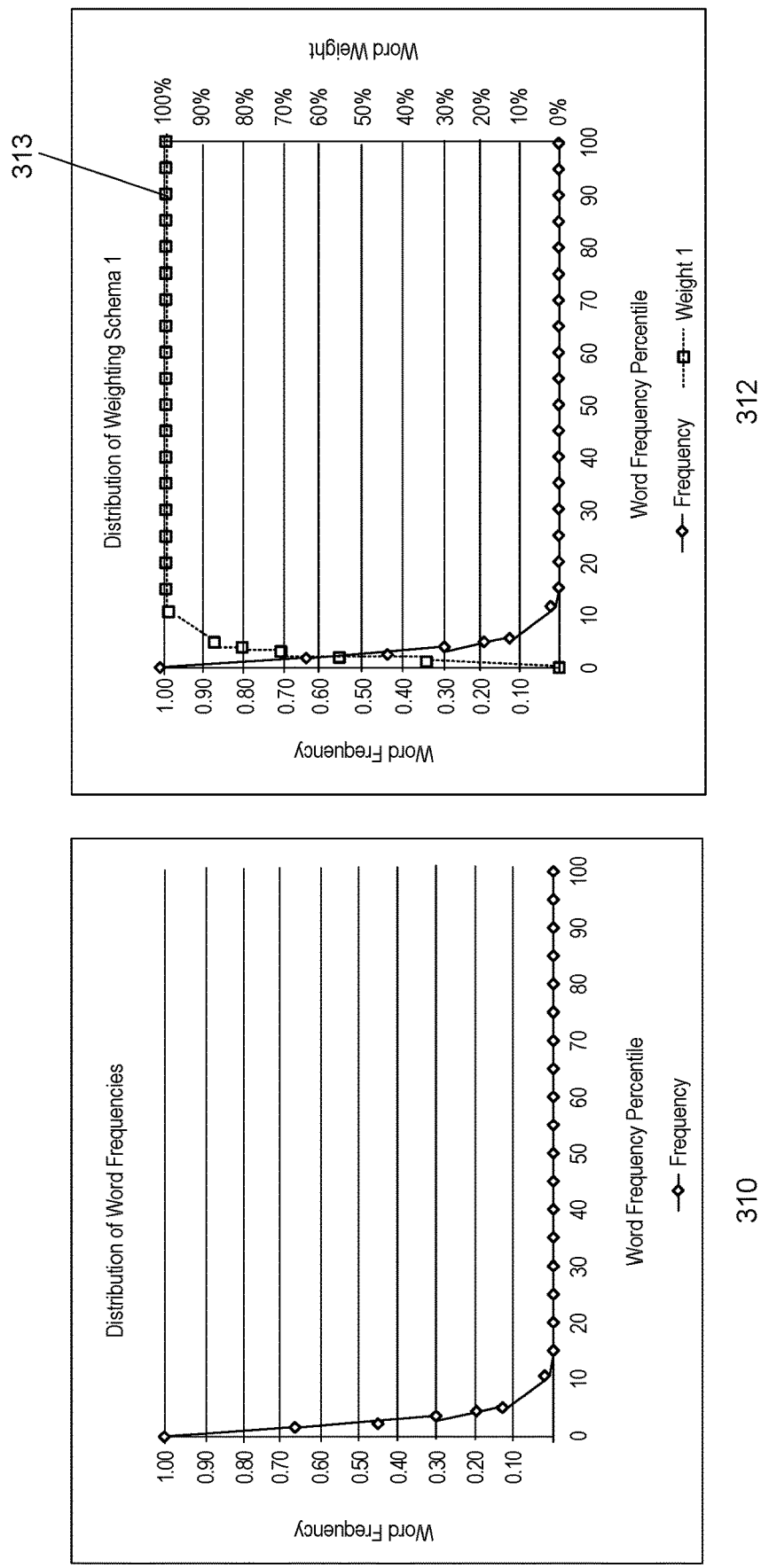

Based on the frequency, weights may be applied to a word at step 118. For example, in food and beverage, terms such a "restaurant" and "café" may be common. These types of words may be underweighted. Within a particular location, certain words may be more frequent. In the New York area, words such as "New York" or "Big Apple" may be identified as frequent and may accordingly under emphasized by assigning a lower weight. For example, weights may be based on a frequency determination, such as inverse document frequency. Exemplary weighting schemes are illustrated in FIGS. 3A and 3B.

At step 120, string similarity algorithms may be applied to the data to identify best matches. An embodiment of the present invention may apply a string similarity algorithm to transaction and other data based on contextual information to better identify and match merchant information. An embodiment of the present invention may be applied to other application, scenarios, use cases, etc.

According to an embodiment of the present invention, a subset of the transactions may be resolved to entities via the Context Weighted Words process and algorithms. An embodiment of the present invention is directed to leveraging a process including (1) pre-processing, (2) metadata creation, and (3) custom algorithms to resolve entities.

Pre-Processing may involve identifying relevant attributes from a raw transaction table and a vendor dataset containing information on companies in the country (e.g., another dataset containing the same entities of interest to which the user needs to match) and cleaning them to enable a more accurate matching process. For a merchant in a given transaction, an embodiment of the present invention may identify candidate entities in a secondary list. The two lists may then be joined together (using industry, location, for example) and then cleanse the entities (e.g., business names) in both lists to enable a one-to-one comparison. For example, the raw transaction table may include Merchant name, Merchant Category Code (MCC), and zip code. The table may include merchant name, Standard Industrial Classification (SIC), and zip code. According to an exemplary illustration, industry categories may be mapped from two tables (e.g., MCC to SIC) to allow joining based on industry. According to an exemplary illustration, locations may be mapped between tables using zip code. Pre-processing may involve using string cleaning functions including: cleaning raw transaction merchant name; and cleaning merchant name.

Pre-processing may include various functions including raw string; normalize (e.g., convert to upper case; remove non-English characters; remove extra white spaces, etc.); remove address (e.g., remove addresses from strings, etc.); remove intermediaries (e.g., remove an online prefix if it belongs to an intermediary, etc.); remove store numbers/digits (e.g., remove runs of digits that appear to provide a store number, transaction number, etc.); remove special characters (e.g., removes most symbols that provide little value in matching such as @, #, $, %, &, etc.); standardize abbreviations (e.g., converts certain abbreviations to full words or full words to common abbreviations, etc.); remove insignificant words (e.g., removes words that provide little vale in matching process such as INC, LLC, CORP, etc.) and final cleaned string. Other normalization and/or filtering functions may be applied.

Pre-processing may involve creating a list of unique merchant names and applying a definition of context (e.g., 2 digit SIC codes or other variation) from the available history of transactions over a predetermined period of time, e.g., 3 years. This may involve cleaning the merchant names using a Pre-Processing methodology.

An embodiment of the present invention may be directed to metadata creation. Metadata may be created to identify or determine what words are frequent or infrequent in a given context. This may involve identifying frequent words and weights. For example, an embodiment of the present invention may build lists of frequent words for the contexts of Industry (e.g., SIC (first 2 digits)) and Location (e.g., ZIP code (first 3 digits)). This may involve calculating word weight in an industry and/or location based on its frequency relative to other words in that context. An embodiment of the present invention may further tune the spread of words' weights using transformations. This may also involve selecting a threshold for frequent words. For example, a word with a weight lower than threshold may be defined as a frequent word.

An embodiment of the present invention may be directed to a weighted words process, which may involve creating weights for each word or word set in a given industry or region. For example, an embodiment of the present invention may find the frequency of a word among merchant names in an industry or region and then transform that into a weight. Weighted words code may include pre-processing, calculating word frequencies, creating final weights and defining frequent words.

Word frequencies calculation may involve splitting out unique words in each name, for each cleaned merchant name. For each SIC, an embodiment of the present invention may rollup all the words and calculate a document frequency for each word. For example, if the word "Diner" shows up in SIC code 58 twenty times out of 100 unique merchant names, its frequency may be represented as 20%. In this example, SIC represent an industry classification context. Other definitions of context may be applied.

In this example, with final weights creation, the final weight may be represented by the log transform of the inverse frequency (e.g., for Diner, the weight may be represented as the log (base 1000) of 5 (i.e., 1/0.2)). Other weighting schemes and variations may be applied.

With Frequent Words definition, an embodiment of the present invention may calculate the mean and standard deviation of the frequencies for each SIC. For each word within that SIC, this may involve calculating its frequency's distance from the mean in terms of standard deviation (SD) (e.g., if in SIC code 58, the mean frequency is 10% and the SD of the frequency may be represented as 5%, then the word Diner's frequency may be two SDs from the mean). For example, only words with frequencies at least 3 SDs from the mean may be weighted in the string similarity score (for Location; 10 SDs for 3 digit zip code).

FIG. 2 is an exemplary illustration of weighted words, according to an embodiment of the present invention. FIG. 2 illustrates Location Based Weighted Words and Industry Based Weighted Words. Chart 210 provides zip code, word, word frequency, word rank, word frequency scoring and number of standard deviation from the mean. In this example, within a common zip code area, the ranking of words includes AUTO, OCEAN, SHORE, TOMS, RIVER, LAKEWOOD, CT, BRICK and JERSEY. Chart 210 illustrates location based weighted words.

Chart 220 provides SIC2, word, word frequency, word rank, word frequency scoring, and number of standard deviations from the mean. In this example, within a common SIC2, the ranking of words includes: CAFE, REST, PIZZA, EAT24, BAR, GRILL, FOOD, HOUSE and LA. Chart 220 illustrates industry based weighted words. In this example, SIC2, 58 represents eating and drinking places. Other context definitions may be applied in accordance with the various embodiments of the present invention.

FIGS. 3A and 3B illustrate a distribution of weighting, according to an embodiment of the present invention. An embodiment of the present invention is directed to applying weights to different words (or components of words) in an algorithm, such that frequent words receive lower weights and infrequent words receive higher weights. The weighting schemas described and illustrated in FIGS. 3A and 3B are directed to transforming word frequencies into weights. For example, a word that is 50% frequent within a given context (which may be considered very high) may receive a very low weight. As illustrated in FIGS. 3A and 3B, different weighting schemas may be applied. Other weighting and frequency schemas may be applied, including inverse document frequency.

Chart 310 illustrates a distribution of word frequencies. As shown by 310, some words are frequent, but most are very infrequent. After the top few percentiles, words occur less than a fraction of a percent of the time. Chart 310 illustrates word frequency.

Chart 312 illustrates a distribution of an exemplary weighting schema 1. As shown by 312, a natural weighting schema may set the weight as the complement of the frequency. This yields a few words with weight 0 and most with weight 1. As shown by 313, there is little spread. Graph 313 represents weight 1.

Chart 314 illustrates a distribution of an exemplary weighting schema 2. As shown by 314, taking the log of the word frequency naturally generates more spread in weights. The inverse of word frequency may actually be needed to generate the correct sign. With a low base, there is still little spread as shown by 315. Graph 315 represents weight 2.

As shown by 316, increasing the base of the log of the inverse word frequency generates more spread between the weights. A base between 1,000 and 100,000 empirically works well, as shown by 317. Graph 317 represents weight 3. As shown in FIGS. 3A and 3B, the exemplary charts illustrate various weighting schema that maps frequencies to weights. The weighting schemas illustrated by Chart 310 and 312 tend to yield weights either close to 0 or close to 1. The weighting schema illustrated by Chart 314 tend to create more variation in the weights. The variation illustrates nuance in the data, which may be ultimately desired. FIGS. 3A and 3B illustrates examples of how to weight and other weighting schemas may be applied (e.g., inverse document frequency, etc.).

An embodiment of the present invention may be directed to applying custom algorithms. For example, with String Similarity Algorithms, for each transaction, candidate merchants may be selected. This may involve candidate merchants in the same zip-code and related merchant category. An embodiment of the present invention may be applied in multiple ways: executing with a simple string similarity first for efficiency and executing an algorithm on a subset of promising candidates. An embodiment of the present invention may select "top" candidates based on application of a string metric (e.g., Jaccard, etc.) with a threshold, which may be used for efficiency. Jaccard is one example of a similarity algorithm, other algorithms may be applied. String similarity algorithms may apply Context Weighted Words against "top" candidates. From here, a single best match may be selected.

An embodiment of the present invention recognizes that there are various types of string similarities techniques. Exemplary categories of metrics may include e.g., Edit-Distance; N-Gram; Heuristic, etc. An embodiment of the present invention may be directed to applying N-Gram based matching given interpretability, ease of coding, and comparable levels of performance.

An embodiment of the present invention recognizes that simple string similarity matching may encounter issues with common words given a specific context. Here, simple string similarity may refer to string similarity without the application of context weighted words. For example, the presence of common words, within a specific context may artificially inflate match scores. An embodiment of the present invention may generate an improved score by weighting N-grams based on the relative frequency of the words from which they come.

FIG. 4 illustrates an example of context weighted words, according to an embodiment of the present invention. FIG. 4 illustrates an exemplary formulation at 410 and an exemplary Context Weighted Words calculation at 420.

"I" represents an intersection of N-Grams between Input A and Input B. "U" represents the union of N-Grams between Input A and Input B. "n" represents an iterator over the N-Grams in each set. "wn" represents the weight of an N-Gram such that it is the lot of the inverse frequency of the word in a specific context; it is bounded between 0 and 1 and it is the minimum weight if an N-Gram appears in multiple words.

In this example, Input A is "Joe's Restaurant" and Input B is "Jon's Restaurant."

FIG. 4 illustrates an exemplary Context Weighted Words similarity calculation at 420.

Figure 5:
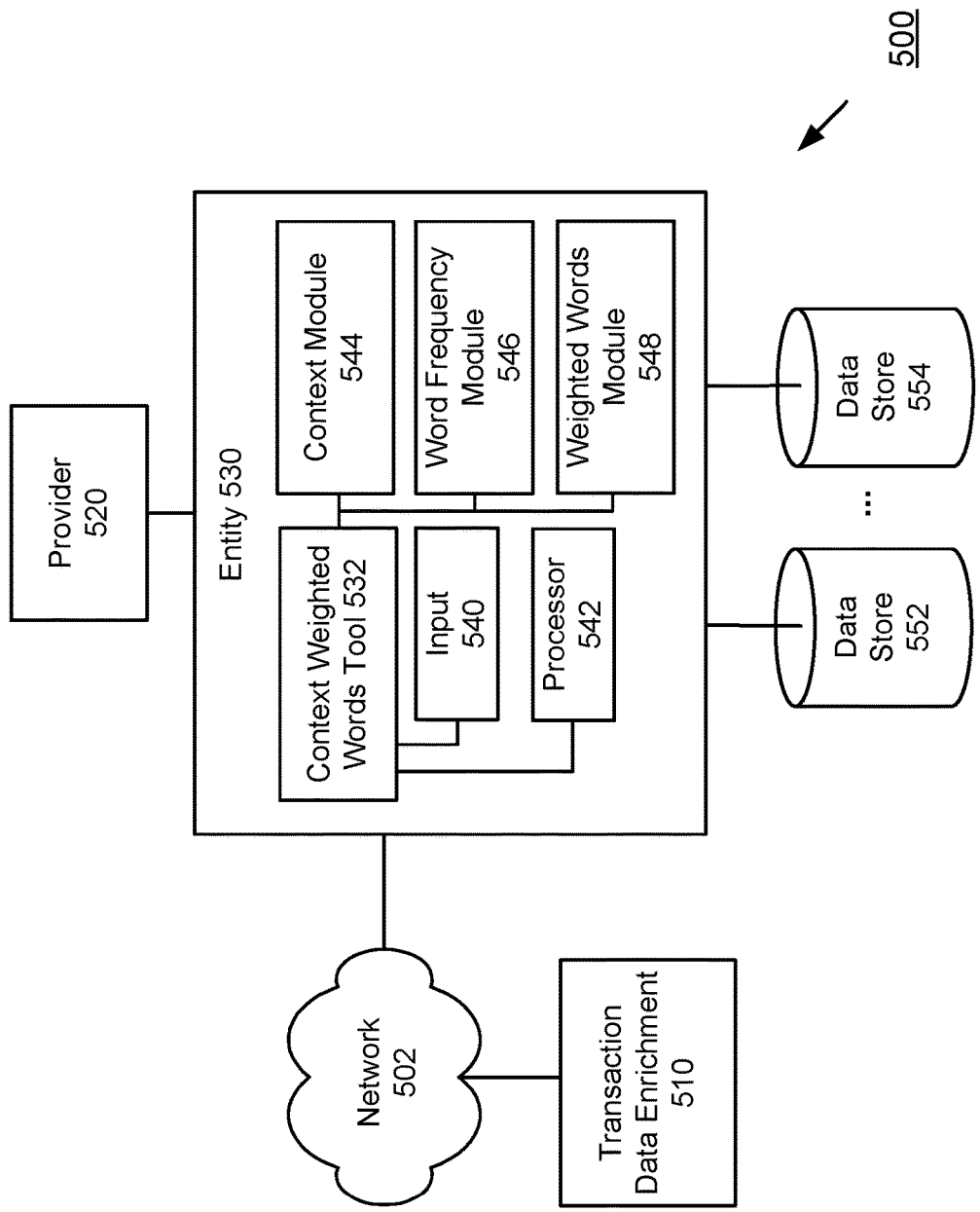
FIG. 5 illustrates a schematic diagram of a system that implementing a Context Weighted Words Tool, according to an exemplary embodiment.

FIG. 5 illustrates a schematic diagram of a system that implementing a Context Weighted Words Tool, according to an exemplary embodiment. As illustrated in FIG. 5, Network 502 may be communicatively coupled to an exemplary system or application, such as Transaction Data Enrichment 510 via various computing devices. Other inputs may be received. Computing devices may include computers, laptops, workstations, kiosks, terminals, tablets, mobile devices, mobile phones, smart devices, etc. Network 502 communicates with Entity 530 that performs context weight words analysis. Entity 530 may include a Context Weighted Words Tool 532 that generates and implements a string similarity score where contextual information is used to weight word importance.

Context Weighted Words Tool 532 may also incorporate modules and other functions, such as Input 540, Processor 542, Context Module 544, Word Frequency Module 546 and Weighted Words Module 548. These modules are exemplary and illustrative, Context Weighted Words Tool 532 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Input 540 may receive transaction data from Transaction Data Enrichment 510. Transaction data may be pre-processed. This may involve identifying relevant attributes from a raw transaction table and a vendor dataset containing information on companies in the country and clean them to enable a more accurate matching process.

Context Module 544 may identify attributes associated with industry, location and/or other context. Context information may be applied to more accurately weight words.

Word Frequency Module 546 may calculate word frequency based on context. For example, an embodiment of the present invention may calculate the mean and standard deviation of the frequencies for each SIC where industry is the context. Other metrics may be considered in other contexts. For each word within that SIC, this may involve calculating its frequency's distance from the mean in terms of standard deviation (SD). For example, words with frequencies at least three SDs from the mean may be weighted in the string similarity score.

Weighted Words Module 548 may apply weights for each word or word set in a given industry or region. For example, an embodiment of the present invention may find the frequency of a word among merchant names in an industry or region and then transform that into a weight. Weights may be applied such that frequent words are weighted less while infrequent words are given more weight.

Processor 542 may apply an appropriate string similarity algorithm to resolve the transaction data. For example, an embodiment of the present invention more accurately identifies merchants in transaction data by considering context and adjusting similarity scores based on word frequency.

Entity 530 may be communicatively coupled to data storage devices represented by Data stores 552, 554. Also, Data stores 552, 554 may also store and maintain context information, word frequency, word weights, etc. The context weighted word calculation and analysis described herein may be provided by Entity 530 and/or a third party provider, represented by 560, where Provider 520 may operate with Entity 530.

The system 500 of FIG. 5 may be implemented in a variety of ways. Architecture within system 500 may be implemented as hardware components (e.g., module) within one or more network elements. It should also be appreciated that architecture within system 500 may be implemented in computer executable software (e.g., on a tangible, non-transitory computer-readable medium) located within one or more network elements. Module functionality of architecture within system 500 may be located on a single device or distributed across a plurality of devices including one or more centralized servers and one or more mobile units or end user devices. The architecture depicted in system 500 is meant to be exemplary and non-limiting. For example, while connections and relationships between the elements of system 500 is depicted, it should be appreciated that other connections and relationships are possible. The system 500 described below may be used to implement the various methods herein, by way of example. Various elements of the system 500 may be referenced in explaining the exemplary methods described herein.

Network 502 may be a wireless network, a wired network or any combination of wireless network and wired network. For example, Network 502 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 502 may support an Internet network, a wireless communication network, a cellular network, Bluetooth, or the like, or any combination thereof. Network 502 may further include one, or any number of the exemplary types of networks mentioned above operating as a stand-alone network or in cooperation with each other. Network 502 may utilize one or more protocols of one or more network elements to which it is communicatively coupled. Network 502 may translate to or from other protocols to one or more protocols of network devices. Although Network 502 is depicted as one network for simplicity, it should be appreciated that according to one or more embodiments, Network 502 may comprise a plurality of interconnected networks, such as, for example, a service provider network, the Internet, a cellular network, corporate networks, or even home networks, or any of the types of networks mentioned above.

Data may be transmitted and received via Network 502 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 5 illustrates individual devices or components, it should be appreciated that there may be several of such devices to carry out the various exemplary embodiments. Entity 530 may communicate using any mobile or computing device, such as a laptop computer, a personal digital assistant, a smartphone or other computing devices capable of sending or receiving network signals. Computing devices may have an application installed that is associated with Entity 530.

Entity 530 may be communicatively coupled to Data Stores 552, 554 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database including big data environments such as Hadoop and associated file systems and databases, as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 502, or communications may involve a direct connection between the various storage components and Entity 530, as depicted in FIG. 5. The storage components may also represent cloud or other network based storage.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, Scala, R, Python, SQL, HQL, Spark (via Python, Scala), etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for improving data transaction integrity by utilizing context weighted words to improve an accuracy of an identification of parties within transactions, the system comprising:

an input configured to receive input data relating to the transactions;

a memory configured to store and manage context data and the transaction data; and a computer processor coupled to the input and the memory and further configured to:

receive the input data comprising a set of transaction data for a plurality of transactions made at a point-of-sale device, the transaction data identifying a merchant and further including electronic funds transfer data;

apply a pre-processing process and a string cleaning process to create a list of unique company names from the set of transaction data, wherein the string cleaning process includes string normalization;

identify a context relating to the set of transaction data, the context comprising a determination of to what the transaction data pertains based on one or more characteristics that are common to the transaction data;

calculate word frequencies for each unique company name from the list of unique company names based on the context, wherein the calculating word frequencies further comprises calculating, in terms of standard deviation, a distance of each of the word frequencies from mean of the word frequencies;

list, within a table, each of the unique company names by rank according to the word frequencies for each unique company name from the list of unique company names, wherein the table comprises: each of the unique company names, the word frequencies for each unique company name from the list of unique company names, a rank for each of the unique company names, and the distance of each of the word frequencies from mean of the word frequencies;

utilize the table to eliminate an artificial inflation of a similarity between different unique company names having matching words by:

creating weights for each of the unique company names in the list from the set of transaction data based on a corresponding calculated word frequency in light of the context, wherein the weighting is inverse to a defined corpus of words, and wherein no weight is given to each of the word frequencies whose distance from the mean is less than three times the standard deviation;

applying a string similarity algorithm for each transaction against candidates, using the weights for each unique company name, in order to identify a best matching record from among each of the unique company names, wherein the string similarity algorithm comprises at least one from among a Jaccard algorithm and an Edit-Distance based string similarity algorithm; and identifying the best matching record;

generate, by applying the best matching record to at least one from among at least one merchant tag of the input data and at least one counterparty tag of the input data, enriched input data that identifies at least a corporate hierarchy;

create a repository of corresponding counterparties by leveraging internal reference data and the input data relating to the transactions; and provide, to at least one from among the merchant and at least one corresponding counterparty, the enriched input data that identifies at least the corporate hierarchy.

2. The system of claim 1, wherein the one or more characteristics comprises industry classifications.

3. The system of claim 1, wherein the one or more characteristics comprises a common location that is defined by a geographic location.

4. The system of claim 1, wherein the one or more characteristics comprises a timing that is defined by a season.

5. The system of claim 1, wherein the context is inferred from additional transaction data.

6. The system of claim 1, wherein the transaction data further comprises one or more of: electronic funds transfer data, point-of-sale data and company names.

7. The system of claim 1, wherein the defined corpus of words includes all known company names in a region.

8. The system of claim 1, wherein the pre-processing process comprises: defining the context based on a history of prior transactions.

9. The system of claim 1, wherein the corresponding counterparties comprise counterparties that transact with clients.

10. A method for improving data transaction integrity by utilizing context weighted words to improve an accuracy of an identification of parties within transactions, the method comprising:

receiving, via an input, the input data relating to the transactions, the input data comprising a set of transaction data for a plurality of transactions made at a point-of-sale device, the transaction data identifying a merchant and further including electronic funds transfer data;

applying, via a computer processor, a pre-processing process and a string cleaning process to create a list of unique company names from the set of transaction data, wherein the string cleaning process includes string normalization;

identifying, via the computer processor, a context relating to the set of transaction data, the context comprising a determination of to what the transaction data pertains based on one or more characteristics that are common to the transaction data, and wherein the context further comprises an industry of a specified region;

calculating, via the computer processor, word frequencies for each unique company name from the list of unique company names based on the context, wherein the calculating word frequencies further comprises calculating, in terms of standard deviation, a distance of each of the word frequencies from mean of the word frequencies;

listing, within a table, each of the unique company names by rank according to the word frequencies for each unique company name from the list of unique company names, wherein the table comprises: each of the unique company names, the word frequencies for each unique company name from the list of unique company names, a rank for each of the unique company names, and the distance of each of the word frequencies from mean of the word frequencies;

utilizing the table to eliminate an artificial inflation of a similarity between different unique company names having matching words by:

creating, via the computer processor, weights for each of the unique company names in the list from the set of transaction data based on a corresponding calculated word frequency in light of the context, wherein the weighting is inverse to a defined corpus of words, and wherein no weight is given to each of the word frequencies whose distance from the mean is less than three times the standard deviation;

applying, via the computer processor, a string similarity algorithm for each transaction against candidates, using the weights for each unique company name, in order to identify a best matching record from among each of the unique company names, wherein the string similarity algorithm comprises at least one from among a Jaccard algorithm and an Edit-Distance based string similarity algorithm; and identifying the best matching record;

generating, by applying the best matching record to at least one from among at least one merchant tag of the input data and at least one counterparty tag of the input data, enriched input data that identifies at least a corporate hierarchy;

creating a repository of corresponding counterparties by leveraging internal reference data and the input data relating to the transactions; and providing, to at least one from among the merchant and at least one corresponding counterparty, the enriched input data that identifies at least the corporate hierarchy.

11. The method of claim 10, wherein the one or more characteristics comprises industry classifications.

12. The method of claim 10, wherein the one or more characteristics comprises a common location that is defined by a geographic location.

13. The method of claim 10, wherein the one or more characteristics comprises a timing that is defined by a season.

14. The method of claim 10, wherein the context is inferred from additional transaction data.

15. The method of claim 10, wherein the transaction data further comprises one or more of: electronic funds transfer data, point-of-sale data and company names.

16. The method of claim 10, wherein the defined corpus of words includes all known company names in a region.

17. The method of claim 10, wherein the pre-processing process comprises: defining the context based on a history of prior transactions.

18. The method of claim 10, wherein the corresponding counterparties comprise counterparties that transact with clients.

* * * * *